May 2, 1961 F. J. KROGMAN 2,982,251
CATTLE OILER AND SCRATCHER
Filed Nov. 7, 1958 2 Sheets-Sheet 1

INVENTOR.
Francis J. Krogman
BY
ATTORNEY

May 2, 1961     F. J. KROGMAN     2,982,251
CATTLE OILER AND SCRATCHER
Filed Nov. 7, 1958     2 Sheets-Sheet 2
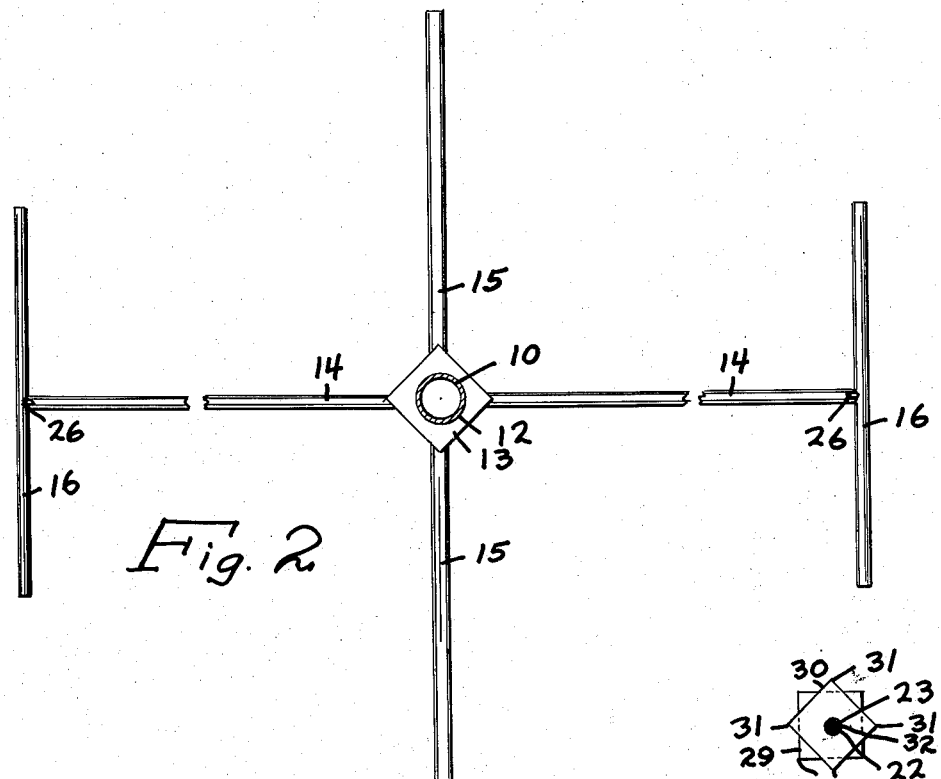
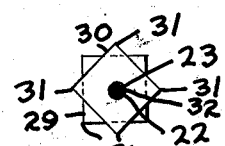
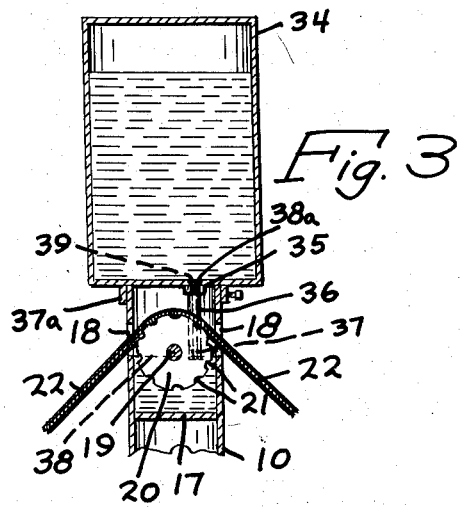
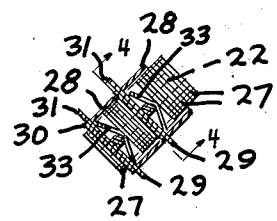
INVENTOR.
Francis J. Krogman
BY
*Sam J. Slotsky*
ATTORNEY United States Patent Office 2,982,251
Patented May 2, 1961

2,982,251
CATTLE OILER AND SCRATCHER
Francis J. Krogman, Rte. 2, Le Mars, Iowa
Filed Nov. 7, 1958, Ser. No. 772,615
1 Claim. (Cl. 119—157)

My invention relates to a cattle oiler and scratcher.

An object of my invention is to provide a cattle oiler and scratcher in which a pair of angularly inclined wick-like members are provided under which the animal will pass, and upon which rubbing action by the animal will actuate a certain oil arrangement so that wick-like members will be impregenated with oil, which oil will pass to the hide of the animal, the aforesaid oil being in the nature of a suitable insecticide oil.

A further object of my invention is to provide such an arrangement to also provide a suitable scratching action for cleaning the dirt from the hide of the animal, as well as rendering the wick-like members more attractive to the animal by virtue of such scratching action, to provide means whereby the animal will constantly receive a supply of the insecticide oil.

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 2 is a sectional view of Figure 1 taken along the lines 2—2 thereof,

Figure 3 is an enlarged detail of the oil arrangement,

Figure 4 is a sectional view taken along the lines 4—4 of Figure 5, and

Figure 5 is an enlarged sectional detail.

Figure 1:
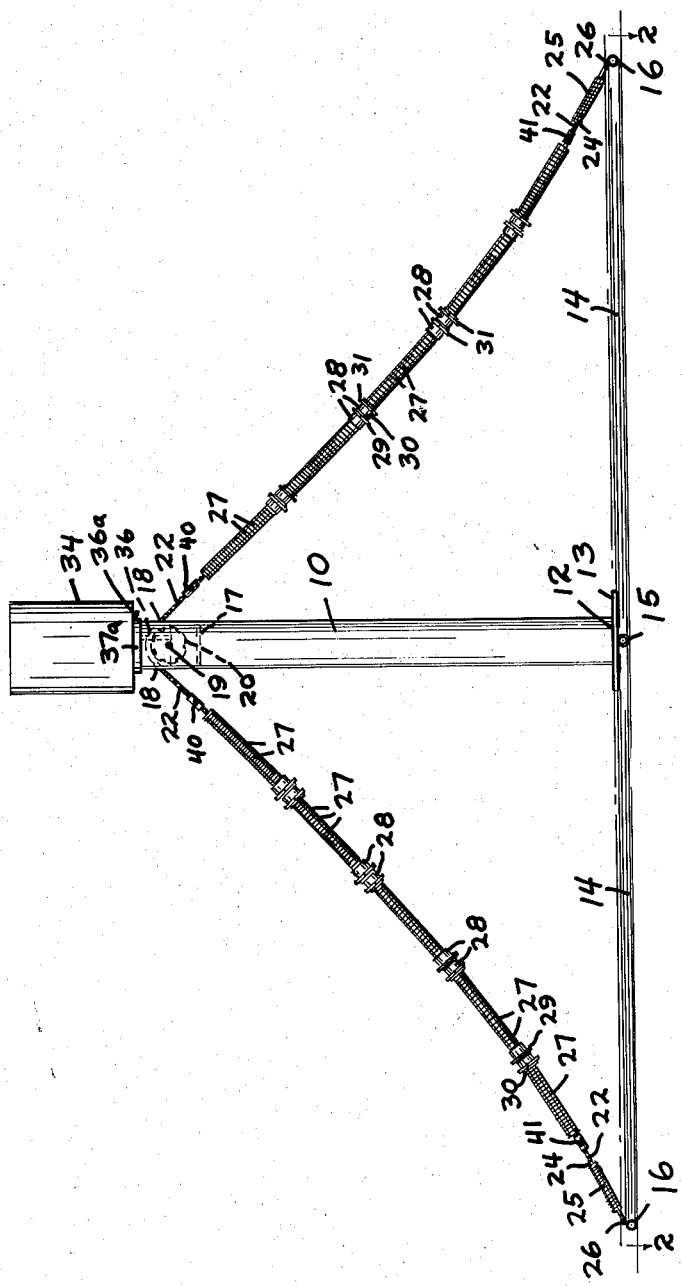
Figure 1 is a side elevation of my device.

My invention contemplates the provision of an oiler and scratcher for animals, especially cattle, which oil is in the nature of an insecticide to keep the animal in a clean, healthful condition, etc., and wherein the oiler has an automatic arrangement for supplying the oil into the cable wicks.

I have used the character 10 to designate a vertically positioned circular pipe which is welded at 12 to a plate 13, to which plate are welded the pipes 14 and transverse pipes 15 to provide a sturdy base for the arrangement, and I have used the character 16 to designate a further pair of spaced pipes which are secured to the pipes 14.

Suitably secured within the pipe 10 is a horizontal wall 17, the character 18 indicating a pair of openings in the pipe 10, and journalled in the upper end of the pipe 10 is a transverse shaft 19 which is secured to a pulley 20 having the pockets 21, and passing over the pulley 20 and through the openings 18 is a lengthened stranded cable 22 which includes a rope core 23 (see Figure 4), this cable being attached at 24 at either side to the springs 25, which springs are attached at 26 to the end pipes 16.

The character 27 indicates a multiplicity of circular washers which are strung upon the cable 22 as shown clearly in Figure 1, and which washers are closely adjacent to each other, certain of these washers being received within the cups 28 (see Figure 5 also), the cups 28 being attached to the square washers 29, which washers 29 are securely welded or otherwise attached to the further square washers 30 in the manner shown in Figure 4 to thereby provide scratching points 31, these washers including openings at 32 for receiving the cable 22.

Received in each of the cups 28 are the bent washers 33 (see Figure 5) to provide means for increasing the supply of oil at these points.

The character 34 indicates an upper reservoir which contains the insecticide oil, and attached at 35 to the reservoir 34 is a pipe 36 having the small opening 37, the lower end of which is adapted to be just beneath the level 38 of the oil which is above the wall or partition 17.

The vessel 34 can be filled from time to time by merely turning the set screw 36a which attaches the collar 37a to the pipe 10, which collar is secured to the vessel 34. The pipe 36 is then unscrewed by means of the nut 38a and the opening 39 is filled, with the vessel 34 being in the inverted position so that after the pipe 36 is again screwed in place and the reservoir is in normal position, a partial vacuum will form above the surface of the oil as shown in Figure 3.

It will be noted from the foregoing that the level of the oil above the wall 17 will be at a constant height, which height will be practically flush with the bottom end of the pipe 36. It will also be noted from Figure 1 that there will be two oiling and scratching elements, one at either side of the post 10, and as the animals pass beneath the strung washers, cups, etc. the oil will be transferred through the washers and the scratching cups and the like to the hide of the animal. The points 31 provide a good scratching medium for the purpose intended, and I further use the small collars 40, having the set screws 41, for keeping the washers in place.

It will be also noted that as the animal bears against the washers, etc. the slack in the cables 22 at either side will be reduced, which in effect will cause the cable 22 to force the pulley 20 to rotate, and during such rotation the pockets 21 will carry the oil up to the point of contact of the cable with the pulley, which oil will run down the cable and the wicking to thereby thoroughly saturate the washers and cups and the like for the necessary purpose, and I have found the arrangement to work in an efficient manner on cattle, etc.

It will now be noted that I have provided the advantages mentioned in the objects of my invention with further advantages being apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

A cattle oiler and scratcher comprising a centrally positioned post, an oil containing reservoir attached to the top of said post, said post having an upper chamber, said reservoir including a pipe communicating with said reservoir and said chamber to provide means for transferring oil to said upper chamber, a rotatable pulley in said chamber, a lower framework attached to said centrally positioned post, a cable passing over said pulley, said cable having a pair of downwardly angularly extending integral portions attached to said framework, said cable including a plurality of washers engaged therewith, said integral cable portions sagging downwardly, whereby rubbing of an animal against said washers will cause said cable to rotate said pulley and transfer oil from said chamber to said cable, a plurality of cups receiving some of said washers, said cables passing through said cups, the bottom washers in each of said cups having a central depressed portion to provide additional oil storing means, scratching members attached to said cups, said scratching members each including pairs of square washers attached to each other, said square washers being attached so that their corners are in alternate relation to provide scratching points.

References Cited in the file of this patent

UNITED STATES PATENTS

| | | |
|---|---|---|
| 2,438,731 | Wedeking | Mar. 30, 1948 |
| 2,766,726 | Duff | Oct. 16, 1956 |
| 2,794,422 | Piel | June 4, 1957 |
| 2,813,510 | Piel | Nov. 19, 1957 |